United States Patent [19]

Wagener

[11] 3,837,540
[45] Sept. 24, 1974

[54] CONTROL METHOD AND APPARATUS
[75] Inventor: Heinrich Wagener, Bochum, Germany
[73] Assignee: Bergwerksverband GmbH, Essen, Germany
[22] Filed: Dec. 22, 1972
[21] Appl. No.: 317,652

[30] Foreign Application Priority Data
Dec. 24, 1971 Germany............................ 2164671

[52] U.S. Cl.................... 222/193, 137/804, 141/67, 141/100, 302/27, 302/35
[51] Int. Cl............................................. B65b 3/26
[58] Field of Search........ 137/804; 141/67, 68, 100; 222/193; 302/27, 28, 35

[56] References Cited
UNITED STATES PATENTS

| | | | |
|---|---|---|---|
| 3,111,931 | 11/1963 | Bodine............................ | 137/835 X |
| 3,258,041 | 6/1966 | Lau.................................. | 141/68 X |
| 3,351,391 | 11/1967 | Green.............................. | 302/53 |
| 3,387,895 | 6/1968 | Hochmuth et al.............. | 302/28 X |
| 3,544,170 | 12/1970 | Bowles............................ | 302/28 |
| 3,567,288 | 3/1971 | Wood.............................. | 302/28 |
| 3,656,495 | 4/1972 | Noren............................. | 137/832 |

FOREIGN PATENTS OR APPLICATIONS
1,047,125 11/1966 Great Britain........................ 302/35

Primary Examiner—Evon C. Blunk
Assistant Examiner—W. Scott Carson
Attorney, Agent, or Firm—Michael S. Striker

[57] ABSTRACT

A method for controlling the flow of fluidized particulate material through a pipe. The material is caused to flow through the pipe due to a pressure differential between the pipe and the region at the outlet thereof; a gas is introduced into the pipe at a pressure sufficient to abruptly interrupt the flow of material. An apparatus for carrying out the method has a container in which the particulate material is fluidized to be conveyed therefrom through a pipe which communicates with the interior of the container and with a region of lower pressure than prevails in the container. Duct means communicate with the interior of the pipe and gas at a higher pressure than that in the pipe may be introduced into the latter via the duct means. This permits control of the flow of material through the pipe by abruptly destroying the pressure gradient between the container and the region to which the pipe discharges.

13 Claims, 6 Drawing Figures

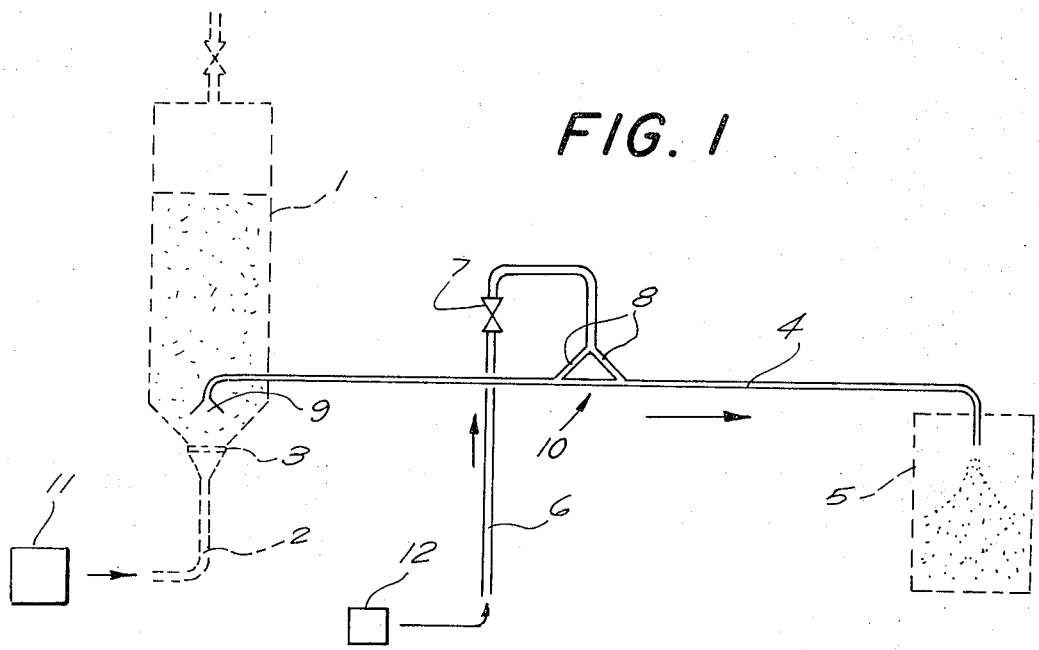
FIG. 1
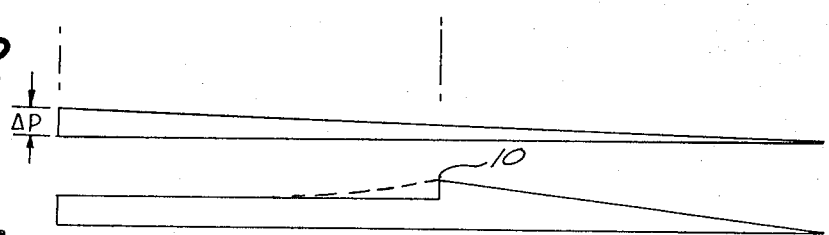
FIG. 2
FIG. 3
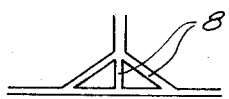
FIG. 4
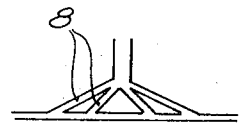
FIG. 5
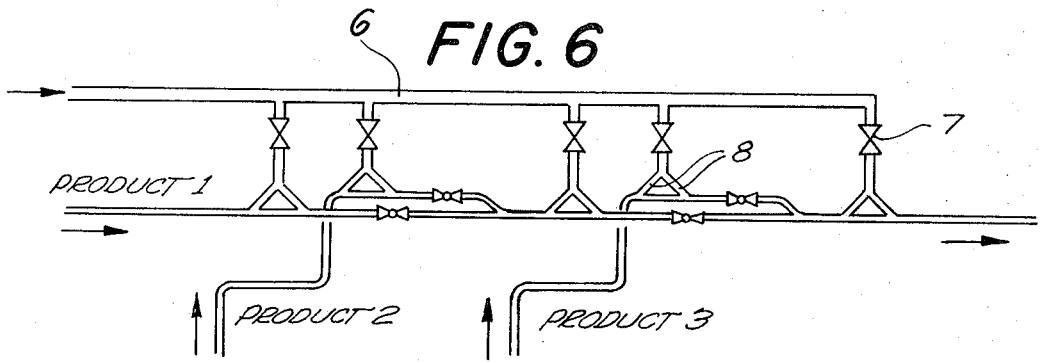
FIG. 6

CONTROL METHOD AND APPARATUS

BACKGROUND OF THE INVENTION

The pneumatic conveying of particulate and powdered materials is known, for instance from "Aufbereitungs-Technik," 8 (1967), No. 10, pages 549–558. The material to be conveyed is fluidized in a closed container having a fluid inlet at the bottom thereof, and simultaneously pressure is built up within the container. A pipe extends into the fluidizing container and, as a result of the pressure differential developed between the fluidizing container and a lower-pressure receiver for the material, the fluidized material is forced out of the fluidizing container along the pipe.

An arrangement for conveying a predetermined quantity of material per unit of time is known from the German Pat. No. DT—AS 1,283,148. This arrangement consists of a shut-off device provided in the conveying pipe. However, since the shut-off device, which may, for example, be a ball valve is subject to substantial wear of its sealing elements, it has heretofore been the practice to first close the inlet through which the gas producing the pressure within the fluidizing container enters the container. The result is a pressure decrease in the fluidizing container and a reduction in the flow of material. Thereafter, the gas line inlet to the container is short-circuited with the pipe upstream of the shut-off device, so as to cause the flow of material to cease entirely. Once the material has stopped flowing, the valve in the gas line may be closed.

Apparatus is also known from the German Pat. No. DT–PS 909,431 which, for the purpose of influencing the flow of material, produces a change in the pressure within the fluidizing container or allows gas to be additionally injected into the pipe through which the material flows.

These methods are not suitable for precisely controlling the flow of material since the change in material flow is not proportional to the change in gas pressure, i.e., the amount of gas introduced. Precise control of the flow of material is only possible if one has a constant stream of material which may be stopped or allowed to flow freely at predetermined time intervals.

SUMMARY OF THE INVENTION

Accordingly, it is an object of the present invention to overcome the above-mentioned disadvantages.

Another object of the present invention is to provide a method whereby the flow of fluidized and fluid materials may be precisely controlled.

A further object of the present invention is to provide a method whereby the flow of fluidized and fluid materials may be abruptly stopped and abruptly started at predetermined time intervals.

An additional object of the present invention is to provide a method whereby the flow of fluidized and fluid materials may be abruptly stopped while maintaining substantially constant the conveying force causing the material flow.

Yet another object of the present invention is to provide an improved apparatus which is particularly well-suited for carrying out the novel method.

In accordance with these and other objects which will become apparent, the present invention provides a method for controlling the flow of fluidized material through a pipe which includes the steps of causing the material to flow through the pipe and introducing a gas into the pipe at a pressure sufficient to abruptly interrupt the flow of material. An improved apparatus is also presented wherein particulate material is fluidized in a fluidizing container, the interior of which is maintained at a lower first pressure. A pipe communicates with the interior of the container, and the fluidized material is conveyed from the container through the pipe. Duct means communicate with the interior of the pipe and gas at a higher second pressure may be introduced into the pipe via the duct means. This permits control of the flow of material through the pipe.

Thus, one of the concerns of the present invention is with a method for the pneumatic control of the flow of particulate and/or powdered materials which are pneumatically conveyed through a pipe from a fluidizing container to a receiving container. The invention is concerned with the problem of improving the flow control of pneumatically conveyed materials, that is, of allowing precise control of the amount of material conveyed per unit time while the material is flowing. The problem is one of allowing the continued flow or stopping the flow of a constant stream of material at predetermined time intervals.

In accordance with the invention, this problem is solved by, in effect, exerting a back-pressure against the flowing material so as to abruptly stop the flow. The material flows through a pipe as a result of the pressure being exerted against it by a continuous stream of conveying gas and the fact that the outlet of the pipe communicates with a lower-pressure region toward which a pressure gradient is established in the pipe. According to the invention, another stream of gas having a somewhat higher pressure than that conveying the material through the pipe, is introduced into the pipe via duct means or a branched duct, so as to eliminate the pressure gradient and thus cause abrupt stopping of the flow of material.

With the invention it is, suprisingly, possible to have a constantly flowing stream of conveying gas and a corresponding constantly flowing stream of material and to abruptly, i.e., without lag, stop and re-start the flow of material without ever shutting off the flow of conveying gas. Thus, during the time that the material is allowed to flow, a precise feed per unit of time is maintained and, as a result, by suitably choosing the periods of material flow and of flow stoppage, precise volumes or weights of material can be measured out or delivered to the receiving container, user or the like. In accordance with the invention, the pressure in the duct means or in the branched duct, i.e., the pressure of the gas which eliminates the pressure gradient, may exceed the pressure in the fluidizing container by a maximum of 1 atmosphere. Preferably, however, the difference in pressure lies between 0.02 and 0.5 atmospheres.

Investigations were made with a conveying pipe having an inner diameter of 3 mm, sand of less than 1 mm particle size as the material to be conveyed, and a fluidizing and conveying gas having a pressure 1 atmosphere greater than atmospheric pressure. These investigations showed, as an example, that the feed capacity or rate for continuous flow was 45 kg of sand per hour and that the feed capacity for pulsed flow was 1.3 g of sand per pulse where flow periods lasted 0.2 seconds and the gas exerting the back-pressure had a pressure of 1.02 atmospheres greater than atmospheric pressure. Any feed capacity within the above range of feed capacities could be obtained by proper choice of the impulse period duration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 schematically illustrates one form of the improved apparatus according to the invention;

FIG. 2 schematically illustrates the pressure distribution developed in the apparatus of FIG. 1 during continuous flow;

FIG. 3 schematically illustrates the manner in which the pressure distribution of FIG. 2 is altered when a gas for producing a back-pressure is introduced into the apparatus of FIG. 1 to stop the flow;

FIG. 4 shows another form of the duct means through which the gas for producing the back-pressure is introduced into the apparatus of FIG. 1;

FIG. 5 shows yet another form of the duct means; and

FIG. 6 schematically illustrates a form of the apparatus as adapted for the simultaneous flow and control of several materials from different sources therein.

DESCRIPTION OF THE PREFERRED EMBODIMENTS

The novel method will be described in conjunction with the improved apparatus illustrated in FIG. 1. The particulate material to be conveyed is held in the container means or fluidizing container 1. This material is fluidized by means of a first fluid or gas supplied from a first gas source 11 which may also include means for controlling the rate of flow of the first gas. The first gas, having a substantially constant pressure, flows from source 11 through duct 2 which communicates therewith and into container 1 via inlet 3 provided at the bottom of container 1, thereby fluidizing the material. The fluidized material is then conveyed through conveying means or pipe 4 to receiving means or receiving container 5. This conveying effect is attained by virtue of the fact that a sufficiently high pressure differential is developed between fluidizing container 1 and receiving container 5. The pressure differential is due to the first gas which produces in container 1 and pipe 4 a first pressure which is higher than that in container 5. Valve means or other suitable means may be provided for controlling the pressure in container 1.

The pressure distribution between containers 1 and 5 along pipe 4 when the material flows continuously is illustrated in FIG. 2. Symbol $p$ represents the pressure differential between containers 1 and 5.

Referring again to FIG. 1, the manner in which the flow of material may be brought to a complete and abrupt halt will now be described. In accordance with the invention, this is accomplished by introducing a second gas having a second pressure higher than the pressure in container 1 into pipe 4. The difference between the first and second pressures should not exceed 1 atmosphere and, preferably, should be between 0.02 and 0.5 atmospheres. The second gas flows from second gas source 12, which may also include means for controlling the rate of flow of the second gas, into duct means 6, 8 provided with valve means 7 and thence into pipe 4. Thus, the second gas produces a back-pressure which eliminates the pressure differential between the location at which duct means 6, 8 communicates with pipe 4 and container 1, thereby bringing the flow to an abrupt and complete halt. Duct means 6, 8 includes a first duct portion 6 and a branched second duct portion, shown here as having two branches or branch members 8. The first duct portion leads to gas source 12 at one of its ends and communicates with the second duct portion at its other end. The second duct portion communicates with the interior of pipe 4. It is noteworthy that the flow of the first gas into container 1 need not be shut off in order to bring the flow of material to a complete and abrupt halt.

FIG. 3 shows the pressure distribution between containers 1 and 5 along pipe 4 when the second gas is being introduced into pipe 4 at the approximate location indicated by 10. It is seen that the pressure is greatest at location 10 and, as shown by the dashed line, the pressure falls off gradually in direction towards container 1, eventually becoming constant. Thus, a pressure differential still exists between container 1 and location 10 but the differential is such as to oppose flow of material from container 1 to location 10. On the other hand, the pressure differential between location 10 and container 5 is such as to promote flow of material from location 10 to container 5.

It has been shown that introduction of the second gas at the higher second pressure into pipe 4 via a single, non-branched, randomly oriented duct does not lead to the desired result. The injection effect produced and additionally aided by the constant flow of the first gas through inlet 3 into container 1 has the consequence that the flowing material does not come to a complete halt. Only by using a branched duct such as, for example, the second duct portion with branches 8, can an abrupt and complete halt of the material flow be obtained.

The back-pressure produced must not, however, raise the pressure in container 1. Rather, the pressure gradient from location 10 towards the container 1 must not be allowed to extend into the latter; in other words, the pressure gradient must have disappeared before it can reach the funnel-shaped inlet member 9 in container 1. It has been found that this effect is easily obtainable where a constant flow of the first gas out of container 1 into pipe 4 exists. It is also to be noted that when the pipe 4 is horizontally oriented, as shown in FIG. 1, it is particularly advantageous, although not absolutely necessary, for the duct means 6, 8 to communicate with the pipe 4 at the upper side thereof.

FIGS. 4 and 5 are self-evident; they illustrate further examples of configurations for the branched duct portions and are not believed to require further discussion. Also, according to the invention it is particularly advantageous in these and the other embodiments if the cross-sectional area of each branch member 8 is substantially equal to the cross-sectional area of the pipe 4 and if the cross-sectional area of the first duct portion 6 is substantially equal to the sum total of the cross-sectional areas of the branches 8.

FIG. 6 shows, as an example of a practical application, an installation for simultaneously controlling the flow of a plurality of different products in a pipe 4. The gas for producing the back-pressure flows through duct means 6, 8 provided with valve means 7. Containers, gas sources and the like have been omitted for clarity.

It will be understood that each of the elements described above, or two or more together, may also find a useful application in other types of applications and apparatus differing from the types described above.

While the invention has been illustrated and described as embodied in a control method and apparatus, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In an apparatus wherein fluidized particulate material is conveyed, in combination, conduit means defining a flow path for fluidized particulate material, said flow path having an inlet region and an outlet region; means for generating a pressure differential intermediate said inlet and said outlet regions so as to cause flow of said material along said path; a source of gas having a pressure in excess of the pressure in said conduit means; and means for introducing into said conduit means at a location of said path intermediate said inlet and said outlet regions at least two streams of gas, at least one of which has a flow component directed upstream countercurrent to the direction of flow of said material and at a pressure sufficient to stop the flow of said material from said inlet region and at least one of which has a flow component directed downstream so that the thus introduced gas streams will, on the one hand, stop flow of material from the inlet region, and on the other hand simultaneously advance the flow of material located downstream from the point of introduction, so that such downstream located material will be transported in downstream direction.

2. A combination as defined in claim 1, wherein said introducing means comprises a duct communicating with said source and said flow path.

3. A combination as defined in claim 2, said conduit means being substantially horizontal and having an upwardly facing side; and wherein said duct communicates with said flow path at said side of said conduit means.

4. A combination as defined in claim 1, wherein said introducing means comprises valve means for controlling the flow of said gas.

5. A combination as defined in claim 1, said introducing means comprising duct means including a first duct portion communicating with said source, and a branched second duct portion fast with said first duct portion; and wherein each of the branches of said second duct portion communicates with said flow path.

6. A combination as defined in claim 5, wherein said second duct portion comprises more than two branches.

7. A combination as defined in claim 5, said first duct portion having a first cross-sectional area, and said branches each having a second cross-sectional area; and wherein said first cross-sectional area substantially equals the sum total of all of said second cross-sectional areas.

8. A combination as defined in claim 7, said conduit means having a third cross-sectional area; and wherein said second cross-sectional area substantially equals said third cross-sectional area.

9. A method of controlling the flow of fluidized particulate material, comprising the steps of conveying fluidized particulate material along a flow path in a predetermined direction from an inlet region to an outlet region thereof; and introducing into said flow path at a location of said path intermediate said inlet and said outlet regions at least two additional streams of gas, at least one of which has a flow component directed upstream countercurrent to the direction of flow of said material and at a pressure sufficient to stop the flow of said material from said inlet region and at least one of which has a flow component directed downstream so that the thus introduced gas streams will, on the one hand, stop flow of material from the inlet region, and on the other hand simultaneously advance the flow of material located downstream from the point of introduction, so that such downstream located material will be transported in downstream direction.

10. A method as defined in claim 9, wherein the step of conveying said material comprises pneumatically conveying the same at a pressure which is lower than that of said gas.

11. A method as defined in claim 10, wherein the pressure of said gas exceeds the pressure in said path by at most 1 atmosphere.

12. A method as defined in claim 11, wherein the pressure of said gas exceeds the pressure in said path by substantially 0.02–0.5 atmospheres.

13. A method as defined in claim 9, wherein the step of conveying said material comprises continuously pneumatically conveying the same by generating a pressure differential intermediate said inlet and said outlet regions such that the pressure in any portion of said path is lower than the pressure of said gas.

* * * * *